US012354776B2

(12) United States Patent
Yamagishi et al.

(10) Patent No.: US 12,354,776 B2
(45) Date of Patent: *Jul. 8, 2025

(54) MULTILAYER VARISTOR

(71) Applicant: Panasonic Intellectual Property Management Co., Ltd., Osaka (JP)

(72) Inventors: Yuji Yamagishi, Hokkaido (JP); Yoshiyuki Satou, Hokkaido (JP); Naoki Mutou, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 322 days.

This patent is subject to a terminal disclaimer.

(21) Appl. No.: 18/099,008

(22) Filed: Jan. 19, 2023

(65) Prior Publication Data

US 2023/0245805 A1 Aug. 3, 2023

(30) Foreign Application Priority Data

Jan. 31, 2022 (JP) ................................ 2022-013570

(51) Int. Cl.
*H01C 7/108* (2006.01)
*H01C 1/14* (2006.01)

(52) U.S. Cl.
CPC ............... *H01C 7/108* (2013.01); *H01C 1/14* (2013.01)

(58) Field of Classification Search
CPC .................................. H01C 7/108; H01C 1/14
See application file for complete search history.

(56) References Cited

U.S. PATENT DOCUMENTS 5,870,273 A 2/1999 Sogabe et al.
2016/0027561 A1* 1/2016 Inoue ...................... H01G 4/30 338/20

FOREIGN PATENT DOCUMENTS

JP H05283209 * 10/1993
JP 2005-197281 A 7/2005
JP 2007-043133 A 2/2007
KR 1020150012075 * 2/2015

OTHER PUBLICATIONS

JPH05283209 machine translation (Year: 1993).*
KR1020150012075 machine translation (Year: 2015).*
Non-Final Office Action dated Jul. 15, 2024 issued in the related U.S. Appl. No. 18/098,998.

* cited by examiner

*Primary Examiner* — Kyung S Lee
(74) *Attorney, Agent, or Firm* — Rimon P.C.

(57) ABSTRACT

A multilayer varistor according to the present disclosure includes a sintered compact, at least one pair of internal electrodes, and at least one pair of external electrodes. The sintered compact contains at least a Zn oxide and a Pr oxide. The at least one pair of internal electrodes are provided inside the sintered compact and contain, as a main component, at least one selected from the group consisting of Pd and Ag and, as a sub-component, an oxide of at least one element selected from the group consisting of Pr, Mn, Co, and Sb. The at least one pair of external electrodes are arranged to cover the sintered compact partially and electrically connected to the at least one pair of internal electrodes, respectively.

7 Claims, 1 Drawing Sheet

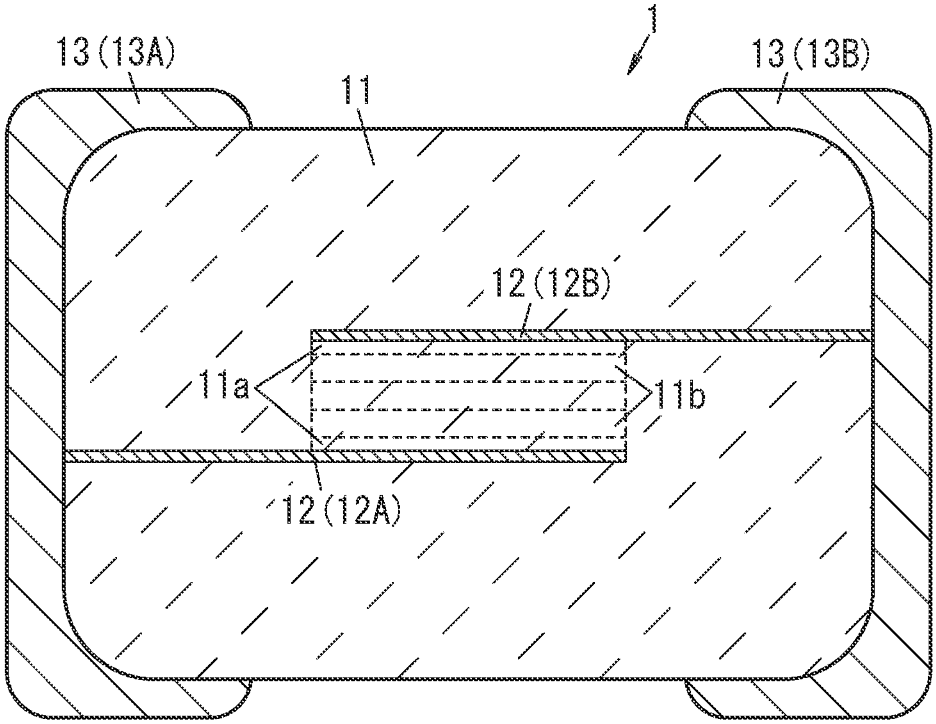
1
13(13A)
13(13B)
11
12(12B)
11a
11b
12(12A)

MULTILAYER VARISTOR

CROSS-REFERENCE TO RELATED APPLICATIONS

The present application is based upon, and claims the benefit of priority to, Japanese Patent Application No. 2022-013570, filed on Jan. 31, 2022, the entire contents of which are hereby incorporated by reference.

TECHNICAL FIELD

The present disclosure generally relates to a multilayer varistor, and more particularly relates to a multilayer varistor including a sintered compact, internal electrodes, and external electrodes.

BACKGROUND ART

Multilayer varistors have been used to, for example, protect various types of electronic equipment and electronic devices from an abnormal voltage generated by lighting surge or static electricity, for example, and prevent the various types of electronic equipment and electronic devices from malfunctioning due to noise generated in a circuit.

JP 2005-197281 A discloses a multilayer chip varistor including a varistor body and external electrodes. The varistor body includes: a plurality of varistor layers, each containing ZnO as a main component thereof and Pr as a sub-component thereof; and internal electrodes, each of which contains Pd, Ag, and an Al oxide, of which the proportion falls within the range from 0.0001% by mass to 1.0% by mass with respect to 100% by mass in total of Pd and Ag and which are arranged substantially parallel to each other to interpose the varistor layers between themselves. The external electrodes are provided at the ends of the varistor body and respectively connected to the internal electrodes.

However, the multilayer varistor of JP 2005-197281 A tends to exhibit a significant dispersion in its varistor characteristics, which are represented by a varistor voltage variation coefficient, for example, and also has insufficient voltage nonlinearity, which is represented by a voltage nonlinearity index (a), for example.

SUMMARY

The present disclosure provides a multilayer varistor which tends to exhibit a significantly reduced dispersion in its varistor characteristics and excellent voltage nonlinearity.

A multilayer varistor according to an aspect of the present disclosure includes a sintered compact, at least one pair of internal electrodes, and at least one pair of external electrodes. The sintered compact contains at least a Zn oxide and a Pr oxide. The at least one pair of internal electrodes are provided inside the sintered compact and contain, as a main component, at least one selected from the group consisting of Pd and Ag and, as a sub-component, an oxide of at least one element selected from the group consisting of Pr, Mn, Co, and Sb. The at least one pair of external electrodes are arranged to cover the sintered compact partially and electrically connected to the at least one pair of internal electrodes, respectively.

BRIEF DESCRIPTION OF DRAWINGS

The FIGURES depict one or more implementations in accordance with the present teaching, by way of example only, not by way of limitations. In the FIGURES, like reference numerals refer to the same or similar elements.

FIG. 1 is a schematic cross-sectional view of a multilayer varistor according to an exemplary embodiment.

DETAILED DESCRIPTION

(1) Overview

A multilayer varistor according to an exemplary embodiment of the present disclosure will now be described with reference to the accompanying drawings. FIG. 1 to be referred to in the following description of embodiments is a schematic representation. Thus, the ratio of the dimensions (including thicknesses) of respective constituent elements illustrated in FIG. 1 does not always reflect their actual dimensional ratio.

A multilayer varistor 1 according to an exemplary embodiment includes a sintered compact 11, at least one pair of internal electrodes 12, and at least one pair of external electrodes 13. The sintered compact 11 contains at least a Zn oxide and a Pr oxide. The at least one pair of internal electrodes 12 are provided inside the sintered compact 11 and contain, as a main component thereof, at least one selected from the group consisting of Pd and Ag (hereinafter referred to as a "main component (A)") and, as a sub-component thereof, an oxide of at least one element selected from the group consisting of Pr, Mn, Co, and Sb (hereinafter referred to as a "sub-component (B)"). The at least one pair of external electrodes 13 are arranged to cover the sintered compact 11 partially and electrically connected to the at least one pair of internal electrodes 12, respectively.

The multilayer varistor 1 according to this embodiment tends to exhibit a significantly reduced dispersion in its varistor characteristics and excellent voltage nonlinearity.

The present inventors carried out extensive research and development on a multilayer varistor. As a result, the present inventors discovered that the dispersion in varistor characteristics could be reduced, and the voltage nonlinearity could be improved, by adding an oxide of a particular element to the internal electrodes 12 when the sintered compact 11 contained a Zn oxide and a Pr oxide and the internal electrodes 12 contained at least one of Pd or Ag, thus conceiving the concept of the present disclosure.

It is not completely clear why this advantage is achieved by adopting such a configuration in the present disclosure, but the reason is presumably as follows, for example. Specifically, the dispersion in the varistor characteristics and the decline in voltage nonlinearity would be caused partly because of non-uniform distribution of a Pr oxide in a Zn oxide in the sintered compact 11. If the distribution of the Pr oxide becomes non-uniform during the sintering process to form the sintered compact 11, then the varistor voltage varies from one place to another in the internal electrodes 12, thus increasing the dispersion in the varistor voltage of the multilayer varistor 1. In addition, such non-uniformity in the distribution of the Pr oxide would cause a decline in the voltage nonlinearity at the grain boundary of the sintered compact 11 formed by the baking process. Such non-uniformity in the distribution of the Pr oxide would be caused by, while the sintered compact is formed by baking green sheet layers including an internal electrode paste layer, the movement of the Pr oxide in the green sheet layers toward the internal electrode paste layer to produce a reaction that supplies oxygen to Pd or Ag in the internal electrode paste layer. The present inventors discovered that adding, to the internal electrode paste layer, an oxide of a particular element with the ability to produce such a reaction that supplies oxygen to Pd or Ag under the sintering condition enabled suppressing the reaction between the Pr oxide and Pd or Ag, preventing the Pr oxide from moving from the green sheet layers toward the internal electrode paste layer during the sintering process, and thereby reducing the degree of non-uniformity in the distribution of the Pr oxide in the sintered compact 11.

Thus, the present disclosure provides a multilayer varistor which tends to exhibit a significantly reduced dispersion in its varistor characteristics and excellent voltage nonlinearity.

(2) Details

<Multilayer Varistor>

FIG. 1 is a cross-sectional view of a multilayer varistor 1 according to an exemplary embodiment of the present disclosure. The multilayer varistor 1 includes a sintered compact 11, internal electrodes 12, and external electrodes 13.

The sintered compact 11 is made of a semiconductor ceramic component with a nonlinear resistance characteristic.

The multilayer varistor 1 needs to include at least one pair of internal electrodes 12. The multilayer varistor 1 shown in FIG. 1 includes one pair of internal electrodes 12. In other words, the internal electrodes 12 include a first internal electrode 12A and a second internal electrode 12B.

The multilayer varistor 1 needs to include at least one pair of external electrodes 13. One external electrode 13 is provided to be electrically connected to a single internal electrode 12 or plurality of internal electrodes 12. The multilayer varistor 1 shown in FIG. 1 includes one pair of external electrodes 13. In other words, the pair of external electrodes 13 consists of a first external electrode 13A provided on one end face of the sintered compact 11 and a second external electrode 13B provided on the other end face of the sintered compact 11. When a voltage is applied between the first external electrode 13A and the second external electrode 13B, one of the first and second external electrodes 13A, 13B comes to have the higher potential and the other of the first and second external electrodes 13A, 13B comes to have the lower potential.

The at least two external electrodes 13 are mounted on a printed wiring board on which an electric circuit is formed. The multilayer varistor 1 may be connected to, for example, the input end of the electric circuit. Upon the application of a voltage higher than a predetermined threshold voltage to between the first external electrode 13A and the second external electrode 13B, the electrical resistance between the first external electrode 13A and the second external electrode 13B decreases steeply to cause an electric current to flow through a varistor layer. This enables protecting the electric circuit that follows the multilayer varistor 1.

Optionally, the multilayer varistor 1 may further include a protective layer and a plated electrode, for example, besides the sintered compact 11, the internal electrodes 12, and the external electrodes 13.

Next, the respective constituent elements will be described one by one.

[Sintered Compact]

The semiconductor ceramic component as a constituent component for the sintered compact 11 contains at least a Zn oxide and a Pr oxide. Examples of the Zn oxide include ZnO. Examples of the Pr oxide include $Pr_6O_{11}$. The sintered compact 11 may contain, besides the Zn oxide and the Pr oxide, $Bi_2O_3$, $Co_2O_3$, CaO, $CaCO_3$, and $Cr_2O_3$, for example.

In the sintered compact 11, the content of the Pr oxide is preferably equal to or greater than 0.001% by mass and equal to or less than 2% by mass with respect to the Zn oxide. The sintered compact 11 containing the Pr oxide with this content enables further reducing the non-uniformity in the distribution of the Pr oxide in the sintered compact 11 that would be caused during the baking process. The content of the Pr oxide with respect to the Zn oxide is more preferably equal to or greater than 0.01% by mass and equal to or less than 1.5% by mass, and even more preferably equal to or greater than 0.1% by mass and equal to or less than 1% by mass.

[Internal Electrodes]

The internal electrodes 12 are provided inside the sintered compact 11. The internal electrodes 12 each contain: a main component (A), which is at least one selected from the group consisting of Pd and Ag; and a sub-component (B), which is an oxide of at least one element selected from the group consisting of Pr, Mn, Co, and Sb.

Specific examples of the main component (A) include Pd, Ag, Ag—Pd, and Ag—Pt. Among other things, Pd and Ag—Pd are preferred as the main component (A).

Specific examples of the sub-component (B) include Pr oxides such as $Pr_6O_{11}$, Mn oxides such as $Mn_3O_4$, $Mn_2O_3$, and $MnO_2$, Co oxides such as $Co_2O_3$ and $Co_3O_4$, and Sb oxides such as $Sb_2O_4$ and $Sb_2O_5$. The sub-component (B) is preferably an oxide which may supply oxygen to Pd or Ag as the main component (A) as the valence number of the metallic element changes under a baking condition of about 800° C. The sub-component (B) is more preferably at least one selected from the group consisting of $Pr_6O_{11}$, $MnO_2$, $Co_3O_4$, and $Sb_2O_5$, and is even more preferably $Pr_6O_{11}$.

The content of the sub-component (B) is preferably equal to or greater than 0.001% by mass and equal to or less than 2% by mass with respect to the main component (A). In that case, an oxide of the sub-component (B) would be able to supply sufficient oxygen to Pd or Ag as the main component (A). This would prevent, with more reliability, the Pr oxide from moving toward the internal electrodes during the baking process, and thereby further reducing the degree of non-uniformity in the distribution of the Pr oxide, further reducing the dispersion in the varistor characteristics, and further improving the voltage nonlinearity. In addition, this also ensures sufficient static capacitance without decreasing the effective area of the internal electrodes 12. The content of the sub-component (B) with respect to the main component (A) is more preferably equal to or greater than 0.005% by mass and equal to or less than 1% by mass, even more preferably equal to or greater than 0.01% by mass and equal to or less than 0.5% by mass, and particularly preferably equal to or greater than 0.02% by mass and equal to or less than 0.2% by mass.

In the multilayer varistor 1 according to this embodiment, the non-uniformity in the distribution of the Pr oxide in the sintered compact 11 has been reduced. As an index to the degree of non-uniformity in the distribution of a Pr oxide in the sintered compact 11, a ratio of the concentration of Pr relative to Zn in neighboring regions 11*a* (hereinafter referred to as a "Pr concentration (1)") to the concentration of Pr relative to Zn in adjacent regions 11*b* (hereinafter referred to as a "Pr concentration (2)") in a part located between the pair of internal electrodes 12 inside the sintered compact 11 may be used as shown in FIG. 1. The "neighboring regions 11*a*" are regions in the vicinity of the internal electrodes 12. The "adjacent regions 11*b*" are regions adjacent to the neighboring regions 11*a*. This ratio (Pr concentration (1)/Pr concentration (2)) will be hereinafter referred to as a "Pr concentration increase ratio." That is to say, the Pr concentration increase ratio is the ratio of the Pr concentration in the neighboring regions 11*a* to the Pr concentration in the adjacent regions 11*b*. When measured along a normal to the internal electrodes 12, the thickness of the neighboring regions 11*a* may be 5 μm, for example, and the thickness of the adjacent regions 11*b* may be 10 μm, for example.

In this case, the "concentration of Pr relative to Zn (Pr concentration)" in each of the neighboring regions 11*a* and the adjacent regions 11*b* may be determined by analyzing, using an X-ray microanalyzer (XMA), a cross section of the multilayer varistor 1 that has been taken to expose the respective regions and measuring the X-ray intensities derived from Zn or Pr in each of these regions.

If this Pr concentration increase ratio is equal to or less than 3.0, for example, then the degree of non-uniformity in the distribution of the Pr oxide would be insignificant, the dispersion in the varistor characteristics of the multilayer varistor 1 would also be insignificant, and the voltage nonlinearity would be excellent. The Pr concentration increase ratio is preferably equal to or less than 2.0, more preferably equal to or less than 1.7, even more preferably equal to or less than 1.5, and particularly preferably equal to or less than 1.3.

The multilayer varistor 1 according to this embodiment causes insignificant dispersion in the varistor characteristics and achieves excellent voltage nonlinearity. This is presumably because in the part in which the Pr oxide is located between the pair of internal electrodes 12, the degree of non-uniformity in the distribution of the Pr oxide has been reduced.

Also, if the internal electrodes 12 contain a Pr oxide, the ratio of the concentration of the Pr oxide in the internal electrodes 12 to the concentration of the Pr oxide in the sintered compact 11 (hereinafter referred to as a "Pr concentration ratio") is preferably equal to or greater than 0.01 and equal to or less than 2.0. Setting the Pr concentration ratio at a value falling within the above-described range enables more effectively preventing the Pr oxide from moving from the sintered compact 11 toward the internal electrodes 12. The Pr concentration ratio is more preferably equal to or greater than 0.05 and equal to or less than 1.3, and is even more preferably equal to or greater than 0.2 and equal to or less than 1.0.

The Pr concentration ratio may be determined in the following manner. Specifically, a cross section, which has been taken by cutting off the multilayer varistor 1 such that both the sintered compact 11 and the internal electrodes 12 are exposed, is analyzed with an XMA, and Pr concentrations in respective adjacent cross-sectional regions of the sintered compact 11 and the internal electrodes 12 are determined based on the X-ray intensities derived from Pr, thereby calculating the ratio of the Pr concentration in the internal electrodes to the Pr concentration in the sintered compact.

It is preferable that at least one element selected from the group consisting of Al, In, and Ga be substantially not contained in the internal electrodes 12. If the internal electrodes 12 include at least one of these elements, the voltage nonlinearity of the multilayer varistor 1 could decrease. As used herein, the phrase "substantially not contained" means not adding the element(s) intentionally except a situation where the element(s) is/are contained inevitably. Specifically, this phrase refers to a situation where the content of at least one of these elements is equal to or less than 0.00001% by mass with respect to the main component (A) as a constituent component of the internal electrodes 12.

[Protective Layer]

The protective layer (insulating coating layer, high-resistivity layer) is arranged to cover the sintered compact 11 at least partially. The protective layer contains, for example, silicon oxide, zinc silicate, and/or a glass component.

[External Electrodes]

The external electrodes 13 are arranged to cover the sintered compact 11 partially. Also, the external electrodes 13 are electrically connected to the at least one pair of internal electrodes 12, respectively. If the protective layer is provided, the external electrodes 13 are arranged to cover the protective layer partially.

The external electrodes 13 each contain a metallic component such as Ag, Ag—Pd, or Ag—Pt and a glass component such as $Bi_2O_3$, $SiO_2$, or $B_2O_5$.

[Plated Electrodes]

The plated electrodes are arranged to cover the external electrodes 13 at least partially. The plated electrodes may be, for example, Ni plated electrodes or Sn plated electrodes.

<Method for Manufacturing Multilayer Varistor>

The multilayer varistor 1 may be manufactured by, for example, a manufacturing method including the following first and second steps:

First step: forming a multilayer stack in which a plurality of green sheet layers, each containing a Zn oxide powder and a Pr oxide powder, and a plurality of internal electrode paste layers, each containing a powder of at least one element selected from the group consisting of Pd and Ag, are alternately stacked one on top of another;

Second step: forming a sintered compact 11, including the internal electrodes 12 inside, by baking the multilayer stack; and Third step: forming external electrodes 13 that partially cover the sintered compact 11 and are in contact with the internal electrodes 12 partially.

Optionally, the manufacturing method may further include the following step A to be performed after the second step and before the third step, and may further include the following step B to be performed after the third step:

Step A: forming a protective layer to cover the sintered compact 11 at least partially; and Step B: forming plating electrodes to cover the external electrodes 13 at least partially.

Next, these process steps will now be described in detail one by one.

First Step

The first step includes forming a multilayer stack in which a plurality of green sheet layers and a plurality of internal electrode paste layers are alternately stacked one on top of another.

(Green Sheet Layers)

Each green sheet layer contains a Zn oxide powder and a Pr oxide powder. The green sheet layer may be formed by preparing a slurry as a mixture of the Zn oxide powder, the Pr oxide powder, and an organic component such as an organic solvent and a binder and turning the slurry into a sheet shape by using a coating machine, for example.

(Internal Electrode Paste Layers)

Each internal electrode paste layer contains at least one selected from the group consisting of Pd and Ag.

The internal electrode paste layer may be formed on the green sheet layer by, for example, preparing an internal electrode paste containing a powder of at least one of Pd or Ag and printing the internal electrode paste onto the green sheet layer. The internal electrode paste contains, for example, Pd, Ag, Ag—Pd, or Ag—Pt. It is preferable that at least one element selected from the group consisting of Al, In, and Ga be substantially not contained in the internal electrode paste. If the internal electrodes 12 formed include at least one of these elements, the voltage nonlinearity of the multilayer varistor 1 could decrease.

A multilayer stack may be obtained by stacking the green sheet layer thus formed and the green sheet layers, on each of which the internal electrode paste layer has been formed, one on top of another. This multilayer stack includes at least one pair of internal electrode paste layers which will turn into the internal electrodes 12 when baked.

Second Step

The second step includes forming a sintered compact 11, including the internal electrodes 12 inside, by baking the multilayer stack that has been formed in the first step. The multilayer stack formed in the first step is usually cut off into multiple green chips, which are subjected to the baking process. The baking process may be performed using a known baking furnace such as a ceramic setter. When baked, the internal electrode paste layers inside the multilayer stack turn into internal electrodes 12.

The temperature at which baking is conducted in the second step may be, for example, equal to or higher than 800° C. and equal to or lower than 1500° C. Optionally, a binder removal process may be performed at a temperature, for example, equal to or higher than 300° C. and equal to or lower than 500° C. before the baking process. The baking temperature may be either constant throughout the baking process or changed (i.e., increased and decreased) during the baking process, whichever is appropriate. The duration of the baking process may be, for example, equal to or longer than 1 hour and equal to or shorter than 100 hours. The baking process may be performed in the air or in an atmosphere with any of various oxygen concentrations, whichever is appropriate. The pressure of the atmosphere is normally atmospheric pressure during the baking process.

Step A

The step A includes forming a protective layer covering at least a part of the sintered compact. The protective layer may be formed by, for example, applying a solution containing a precursor of silicon oxide or applying a glass component.

Third Step

The third step includes forming external electrodes 13 that partially cover either the sintered compact 11 or the protective layer and come into contact with the internal electrodes 12 partially.

Examples of the method for forming the external electrodes 13 include applying and then baking an external electrode paste. The external electrode paste may be prepared by mixing together a metal component such as an Ag powder, an Ag—Pd powder, or an Ag—Pt powder, a glass component such as $Bi_2O_3$, $SiO_2$, or $B_2O_5$, for example, and a solvent. Alternatively, a paste containing a metal component and a resin component may also be used as the external electrode paste. The baking temperature may be, for example, equal to or higher than 700° C. and equal to or lower than 800° C.

Step B

The step B includes forming plated electrodes which cover the external electrodes at least partially. The plated electrodes may be formed by, for example, performing Ni plating and Sn plating in this order by electroplating technique, for example.

In this manner, the multilayer varistor 1 according to this embodiment may be manufactured.

EXAMPLES

The present disclosure will now be described more specifically by way of illustrative examples. Note that the specific examples to be described below are only examples of the present disclosure and should not be construed as limiting.

<Manufacturing Multilayer Varistor>

Multilayer varistors representing first to sixth examples, a first comparative example, and a first reference example were manufactured in the following procedure.

[Forming Sintered Compact]

(Preparing Slurry)

A slurry was prepared by adding organic components such as an organic solvent and a binder to a mixture including ZnO (98.5% by mass) as a main material and $Pr_6O_{11}$ (0.5% by mass), $Co_2O_3$ (0.5% by mass), and $CaCO_3$ (0.5% by mass) as sub-materials.

(Forming Green Sheet Layer)

The slurry thus prepared was used and formed, using a coating machine, to a predetermined thickness equal to or greater than 20 μm and equal to or less than 50 μm, thereby forming a green sheet layer.

(Forming Green Sheet Layer on which Internal Electrode Paste Layer is Formed)

A paste having the components shown in the "main component (A) in internal electrode" column and the "sub-component (B) in internal electrode" column in the following Table 1 was prepared as an internal electrode paste, which was printed in a predetermined pattern on the green sheet layer that had been formed as described above, thereby forming a green sheet layer on which the internal electrode paste layer had been formed.

In Table 1, "Ag—Pd (30/70)" refers to an Ag—Pd alloy (with a mixture mass ratio of 30/70).

Also, in Table 1, the phrase "Pd+0.5 mass % of Al added" means that 0.5% by mass of an Al oxide was added to Pd.

Furthermore, in Table 1, the phrase "content of sub-component (B)" means the percentage by mass of the sub-component (B) with respect to the main component (A).

(Forming Multilayer Stack)

A multilayer stack was formed by stacking, one on top of another, the green sheet layers formed described above and the green sheet layers, on each of which the internal electrode paste layer had been formed as described above.

(Baking)

The multi-layer stack was cut off into green chips, which were then baked on a ceramic setter at a temperature of 1300° C. in the air (with an oxygen concentration equal to or higher than 20% by volume), thereby forming a sintered compact including the internal electrodes inside.

(Forming Protective Layer)

A protect layer was formed by applying a solution containing Si as a main component onto the sintered compact thus formed.

[Forming External Electrodes]

An external electrode paste was prepared by mixing an Ag powder, a glass frit, and a solvent together. The external electrode paste thus prepared was applied onto the protective layer on end surfaces of the sintered compact formed as described above and then baked at 800° C., thereby forming external electrodes.

[Forming Plated Electrodes]

An Ni plated electrode was formed by electroplating technique to a predetermined thickness on each of the external electrodes that had been formed as described above and then an Sn plated electrode was formed thereon.

<Evaluations>

The multilayer varistor thus formed was evaluated by the following method in terms of dispersion in varistor characteristics and voltage nonlinearity. In addition, the Pr concentration ratio (that is the ratio of the Pr concentration in the internal electrodes to the Pr concentration in the sintered compact) and the Pr concentration increase ratio (that is the ratio of the Pr concentration in the neighboring regions to the Pr concentration in the adjacent regions) were measured. Furthermore, the electrostatic capacitance of the multilayer varistor was also measured.

(V1mA Variation Coefficient)

A V1mA variation coefficient was obtained as an index to the degree of dispersion in varistor characteristics. Specifically, the V1mA variation coefficient was calculated, based on a standard deviation ($\sigma$) of the variation in voltage (V1mA) measured with respect to a multilayer varistor 1 with V1mA=27 V, by the equation: V1mA variation coefficient=$\sigma \times 100$/V1mA (%).

If the V1mA variation coefficient is equal to or greater than 0.4% and equal to or less than 3.7%, then the sample may be graded as a "GO." On the other hand, if the V1mA variation coefficient is greater than 3.7%, then the sample may be graded as a "NO-GO."

(Voltage Nonlinearity)

A voltage nonlinearity index ($\alpha$) was calculated as an index to the voltage nonlinearity. The voltage nonlinearity index ($\alpha$) was calculated, based on a varistor voltage (V1) measured when a current I1 (of 1 mA) was supplied and a varistor voltage (V2) measured when a current I2 (of 0.01 mA) was supplied, by the equation: $\alpha = \log (I1/I2)/\log (V1/V2)$.

The larger the $\alpha$ value is, the better the voltage nonlinearity is. If $\alpha$ is equal to or greater than 14, then the sample may be graded as a "GO." If $\alpha$ is less than 14, then the sample may be graded as a "NO-GO."

(Pr Concentration Ratio)

The Pr concentration ratio was obtained in the following manner. Specifically, a cross section, which had been taken by cutting off the multilayer varistor such that both the sintered compact and the internal electrodes were exposed, was analyzed with an XMA, and Pr concentrations in respective adjacent cross-sectional regions of the sintered compact and the internal electrodes were determined based on the X-ray intensities derived from Pr, thereby calculating the ratio of the Pr concentration in the internal electrodes to the Pr concentration in the sintered compact.

(Pr Concentration Increase Ratio)

The Pr concentration increase ratio was obtained in the following manner. Specifically, a cross section, which had been taken by cutting off the multilayer varistor such that the respective neighboring regions and adjacent regions were exposed, was analyzed with an X-ray microanalyzer (XMA) such that X-ray intensities derived from Zn or Pr were measured in the respective regions, thereby obtaining the Pr concentrations (Pr/Zn) in the respective regions. Then, the Pr concentration increase ratio was calculated by the equation: Pr concentration increase ratio=Pr concentration in neighboring regions/Pr concentration in adjacent regions.

If the Pr concentration increase ratio is equal to or less than 3.0, then the sample may be graded as a "GO." On the other hand, if the Pr concentration increase ratio is greater than 3.0, then the sample may be graded as a "NO-GO."

(Electrostatic Capacitance)

The multilayer varistors according to the first to sixth examples had electrostatic capacitance falling within the range from 18 pF to 20 pF.

TABLE 1

| | Sub-components(B) in internal electrodes Oxide | Content (mass %) | Pr concentration ratio (internal electrode/sintered compact) | Pr concentration increase ratio (neighboring regions/adjacent regions) | Main component (A) in internal electrodes | Characteristics VlmA variation coefficient | Characteristics Voltage nonlinearity index ($\alpha$) |
|---|---|---|---|---|---|---|---|
| Ex. 1 | $Pr_6O_{11}$ | 0.2 | 0.5 | 1.3 | Pd | 0.7 | 45 |
| Ex.2 | $Pr_6O_{11}$ | 0.05 | 0.5 | 1.7 | Pd | 1.0 | 40 |
| | $MnO_2$ | 0.05 | — | — | | | |
| | $Co_3O_4$ | 0.05 | — | — | | | |
| | $Sb_2O_5$ | 0.05 | — | — | | | |
| Ex.3 | $Pr_6O_{11}$ | 0.02 | 0.05 | 2.5 | Ag—Pd(30/70) | 2.2 | 35 |
| Ex.4 | $MnO_2$ | 0.02 | 0.05 | 2.8 | Pd | 3.2 | 30 |
| Ex.5 | $Co_3O_4$ | 0.02 | 0.05 | 2.8 | Pd | 3.2 | 30 |
| Ex.6 | $Sb_2O_5$ | 0.02 | 0.05 | 2.8 | Ag—Pd(30/70) | 3.2 | 30 |
| Cmp. Ex.1 | | — | — | 4.0 | Pd | 7.0 | 5 |
| Ref. Ex.1 | $Pr_6O_{11}$ | 0.2 | 0.5 | 1.3 | Pd + 0.5 mass % of Al | 1.5 | 7 |

The results shown in Table 1 reveal that the multilayer varistors according to the first to sixth examples each exhibited little dispersion in the varistor characteristics and excellent voltage nonlinearity. On the other hand, the multilayer varistor according to the first comparative example was inferior in dispersion in varistor characteristics and voltage nonlinearity. The multilayer varistor according to the first reference example used Pd, to which Al had been added, as a material for the internal electrodes thereof, and therefore, its voltage nonlinearity was not good.

(Recapitulation)

As can be seen from the foregoing description of the exemplary embodiment and its specific examples, a multilayer varistor (1) according to a first aspect of the present disclosure includes a sintered compact (11), at least one pair of internal electrodes (12), and at least one pair of external electrodes (13). The sintered compact (11) contains at least a Zn oxide and a Pr oxide. The at least one pair of internal electrodes (12) are provided inside the sintered compact (11) and contain, as a main component, at least one selected from the group consisting of Pd and Ag and, as a sub-component, an oxide of at least one element selected from the group consisting of Pr, Mn, Co, and Sb. The at least one pair of external electrodes (13) are arranged to cover the sintered compact (11) partially and electrically connected to the at least one pair of internal electrodes (12), respectively.

In the multilayer varistor (1) according to the first aspect, the internal electrodes (12) contain, as a sub-component thereof, an oxide of a particular element, which would reduce the degree of non-uniformity in the distribution of the Pr oxide in the sintered compact (11). Thus, the multilayer varistor (1) tends to exhibit a significantly reduced dispersion in its varistor characteristics and excellent voltage nonlinearity.

In a multilayer varistor (1) according to a second aspect of the present disclosure, which may be implemented in conjunction with the first aspect, the at least one pair of internal electrodes (12) each contain the sub-component, of which the content is equal to or greater than 0.001% by mass and equal to or less than 2% by mass with respect to the main component thereof.

According to the second aspect, setting the content of the sub-component at a value falling within this range would allow the oxide as the sub-component to supply sufficient oxygen to Pd or Ag as the main component. This enables further reducing the degree of non-uniformity in the distribution of the Pr oxide, thus further reducing the dispersion in the varistor characteristics, and further improving the voltage nonlinearity. In addition, this also ensures sufficient electrostatic capacitance without decreasing the effective areas of the internal electrodes (12).

In a multilayer varistor (1) according to a third aspect of the present disclosure, which may be implemented in conjunction with the first or second aspect, the at least one pair of internal electrodes each contain $Pr_6O_{11}$ as the sub-component thereof.

According to the third aspect, using $Pr_6O_{11}$ as the sub-component enables more effectively reducing the dispersion in the varistor characteristics and improving the voltage nonlinearity.

In a multilayer varistor (1) according to a fourth aspect of the present disclosure, which may be implemented in conjunction with any one of the first to third aspects, in a part, located between the at least one pair of internal electrodes (12), of the sintered compact (11), a concentration of Pr relative to Zn in neighboring regions (11*a*) in the vicinity of the at least one pair of internal electrodes (12) is at most three times as high as a concentration of Pr relative to Zn in regions (11*b*) adjacent to the neighboring regions (11*a*).

According to the fourth aspect, the multilayer varistor (1) may have a decreased degree of non-uniformity in the Pr distribution in the sintered compact (11), which would have something to do with the dispersion in the varistor characteristics and the voltage nonlinearity. This enables providing a multilayer varistor (1) which tends to exhibit a significantly reduced dispersion in its varistor characteristics and excellent voltage nonlinearity.

In a multilayer varistor (1) according to a fifth aspect of the present disclosure, which may be implemented in conjunction with any one of the first to fourth aspects, at least one element selected from the group consisting of Al, In, and Ga is substantially not contained in the at least one pair of internal electrodes (12).

According to the fifth aspect, the at least one pair of internal electrodes (12) contains none of these elements, thus making it easier for the multilayer varistor (1) to exhibit excellent voltage nonlinearity.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered compact containing at least a Zn oxide and a Pr oxide;

at least one pair of internal electrodes provided inside the sintered compact, the at least one pair of internal electrodes containing, as a main component, at least one selected from the group consisting of Pd and Ag and containing, as a sub-component, an oxide of at least one element selected from the group consisting of Pr, Mn, Co, and Sb; and at least one pair of external electrodes arranged to cover the sintered compact partially and electrically connected to the at least one pair of internal electrodes, respectively, wherein Al is not contained in the at least one pair of internal electrodes.

2. The multilayer varistor of claim 1, wherein the at least one pair of internal electrodes each contain the sub-component, of which content is equal to or greater than 0.001% by mass and equal to or less than 2% by mass with respect to the main component thereof.

3. The multilayer varistor of claim 1, wherein the at least one pair of internal electrodes each contain $Pr_6O_{11}$ as the sub-component thereof.

4. The multilayer varistor of claim 1, wherein in a part, located between the at least one pair of internal electrodes, of the sintered compact, a concentration of Pr relative to Zn in neighboring regions of the at least one pair of internal electrodes is at most three times as high as a concentration of Pr relative to Zn in regions adjacent to the neighboring regions.

5. The multilayer varistor of claim 1, wherein at least one element selected from the group consisting of In and Ga is not contained in the at least one pair of internal electrodes.

6. A multilayer varistor comprising:

a sintered compact containing at least a Zn oxide and a Pr oxide;

at least one pair of internal electrodes provided inside the sintered compact, the at least one pair of internal electrodes containing, as a main component, at least one selected from the group consisting of Pd and Ag and containing, as a sub-component, an oxide of at least one element selected from the group consisting of Pr, Mn, Co, and Sb; and at least one pair of external electrodes arranged to cover the sintered compact partially and electrically connected to the at least one pair of internal electrodes, respectively, wherein the at least one pair of internal electrodes each contain the sub-component, of which content is equal to or greater than 0.001% by mass and equal to or less than 2% by mass with respect to the main component thereof.

7. A multilayer varistor comprising:

a sintered compact containing at least a Zn oxide and a Pr oxide;

at least one pair of internal electrodes provided inside the sintered compact, the at least one pair of internal electrodes containing, as a main component, at least one selected from the group consisting of Pd and Ag and containing, as a sub-component, an oxide of at least one element selected from the group consisting of Pr, Mn, Co, and Sb; and at least one pair of external electrodes arranged to cover the sintered compact partially and electrically connected to the at least one pair of internal electrodes, respectively, wherein the at least one pair of internal electrodes each contain $Pr_6O_{11}$ as the sub-component thereof.

* * * * *